United States Patent [19]

Tan

[11] Patent Number: 5,105,938

[45] Date of Patent: Apr. 21, 1992

[54] PIVOT ROD RETENTION STRUCTURE IN MODULAR CONVEYOR BELTS

[75] Inventor: Michael K. Tan, Metairie, La. 70003

[73] Assignee: The Laitram Corporation, New Orleans, La.

[21] Appl. No.: 715,641

[22] Filed: Jun. 14, 1991

[51] Int. Cl.⁵ ............................................. B65G 17/06
[52] U.S. Cl. .................................... 198/853; 198/851
[58] Field of Search ................................ 198/851-853

[56] References Cited

U.S. PATENT DOCUMENTS 4,858,753  8/1978  Hodlewsky ........................ 198/853
4,951,807  8/1990  Roinestad et al. ................. 198/852

*Primary Examiner*—Joseph E. Valenza
*Attorney, Agent, or Firm*—Laurence B. Brown; James T. Cronvich

[57] ABSTRACT

Pivot rods tend to move from a preferred resident working axial position in modular link conveyor belts because of load forces tending to flex the rods, movement of belts around curves and other conditions encountered. This invention provides for pivot rod receptacle apertures in modular link ends which are elongated and contain detenting structure for holding the pivot rod in a bistable position in either end of the elongated apertures. Thus, the edge of links or belts have only one of the ends of the apertures occluded so that rods may be inserted and removed in a slack non-working bistable position and then the rods are moved with a force overcoming the detent into a tension working bistable position where they are confined in their resident working position. A preferred detenting structure in resilient plastic belt modules comprises reduced width waist structure intermediate the two ends of the elongated apertures in one or more of the link ends. The elongated pivot rod receptacle apertures thus form a "figure 8" cross section configuration in plastic modules as detent structure which gives resiliently with manual force to permit the rod to be moved from one end of the elongated aperture to the other to reside in one of two bistable positions.

11 Claims, 6 Drawing Sheets

PIVOT ROD RETENTION STRUCTURE IN MODULAR CONVEYOR BELTS

TECHNICAL FIELD

This invention relates to modular link conveyor belts and links, and more particularly it relates to structure for retaining pivot rods axially in place in a residence articulating position under load conditions.

BACKGROUND ART

In the modular link conveyor belt art, significant attention has been given to the retention of pivot rods axially in a preferred position within the bearing apertures formed in axial alignment in interdigitating modular link ends. Retention heads formed on the pivot rods have been suggested with either detenting structure for retention of preformed heads or with the formation of heads after rods are in place. It is preferable from a cost standpoint to avoid headed pivot rods. Even more important, in the repair of conveyor belts and in the maintenance it is often desirable to remove rods to uncouple belts and/or to replace worn pivot rods, and this is rarely convenient with headed rods. Thus, it has been proposed heretofore that headless pivot rods be used with retention means that permits removal and replacement.

Typically, the assignee of this invention, is co-pending U.S. applications Ser. No. 07/586,389, Sept. 20, 1990 of James M. Lapeyre now U.S. Pat. No. 5,058,732 and Ser. No. 07/610,751, Nov. 8, 1990 of Paul Horton has new U.S. Pat. No. 5,083,660 proposed retention of pivot rods in plastic belt modules by means of flexibly movable retention tabs interfering in normal position with the exit of the pivot rods from the link end apertures. These flexible tabs have the disadvantage of the possibility of breaking off with catastrophic failure in the presence of excessive force or displacement or possible conditions encountered in use of the belts.

U.S. Pat. No. 4,858,753, W. G. Hodlewsky, Aug. 22, 1989 also addresses the problem of holding headless pivot rods in position with different embodiments disclosed. Thus, in one embodiment a spring biased plug is placed in a pivot rod aperture at the edge of a link or belt to confine the pivot rod in place. This presents the significant disadvantage that extra parts must be manufactured, stored and handled in belt assembly. Thus, a second embodiment was proposed that provided for elongated pivot rod slots aligned at the slack no-load belt end with a link or belt edge pivot rod entry-exit aperture, based upon the premise that in the tension loaded belt working position, the aperture would be non-aligned and thus occlude axial displacement of a headless pivot rod.

However, this structure does not produce a fail-safe condition without problems encountered under actual belt working conditions. The belt does not always stay in a tension condition when working. For example, when heavy loads are removed, the belt may encounter slack so that the rods are temporarily moved into a position to exit the belt edge aperture. Also when belts are curved around a bend, the rods may be moved to a position for escape from the belt edgd aperture. Escape may be encouraged by various forces bearing upon the rod to flex it, to expand or contract it, etc. Also with wear of the rod the aperture tolerances change so that the rods may not be securely retained.

It is thus an object of this invention to provide improved modular link conveyor belts for axially retaining removable pivot rods securely in residence working position.

DISCLOSURE OF THE INVENTION

This invention provides elongated pivot rod receiving apertures in modular link ends together with detent structure for retaining the pivot rods in bistable positions at either end of the elongated apertures. Thus, the pivot rods may be forcibly moved in and out of detented working residence positions at the outer ends of the slots in each family of the interdigitate link ends at opposite articiulated ends of the modular link. This securely holds the pivot rods in working residence position where they are axially confined even if the conveyor belt encounters bends or slack conditions. Yet, the pivot rods can be moved into the opposite detented stable position for alignment with a pivot rod entrance-exit aperture at a module or belt edge for ready belt repair or rod replacement. With the structure provided by this invention, no extra parts are required, construction cost for the pivot rod retention structure is trivial and inexpensive headless plastic or metal pivot rods are used.

Further objects, features and advantages of the invention will be found throughout the following description, claims and appended drawings.

BRIEF DESCRIPTION OF THE DRAWINGS

In the drawings, wherein like reference characters are used to identify similar features throughout the several views to facilitate comparison.

THE PREFERRED EMBODIMENTS

Figure 1:
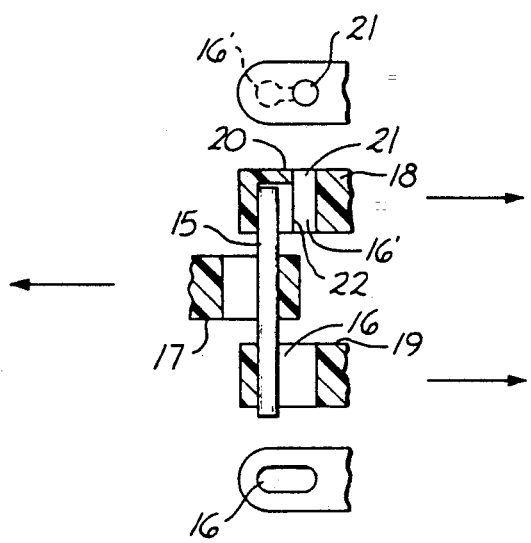
FIG. 1 is a diagrammatic fragmental sketch, partly in section of a modular link conveyor belt embodiment of the invention illustrating its mode of operation.

In the fragmental view of FIG. 1, a pivot rod 15 is lodged in one of two bistable positions in the elongated aperture 16 structure provided in the interdigitate link ends 17, 18 and 19 of two modular links articulated by means of the pivot rod 15. The arrows show that the links are in the tension or working belt position, which provides an occlusion 20 for assuring that the rod is axially confined at the upper edge of the link or belt, when the rod 15 is at the left end of the modified slotted aperture 16'. The rod 15 is positionable in the elongated apertures or slots 16 at either of two ends.

Figure 8:
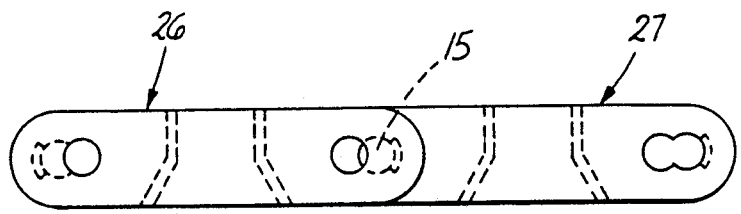
FIG. 8 is an end view of the FIG. 7 embodiment in a bistable rod position for axial retention of the pivot rods.

In the belt or link edge link end 18, the modified slot 16' has the occlusion 20 to retain the pivot rod 15 axially and a ridge or waist 22 causing the modified slotted aperture 16' to attain a substantially "figure 8" configuration, as best seen from the uppermost top view sketch. The waist ridge 22 is resiliently formed, such as by links of a resilient plastic material, to serve as a detent for holding the pivot rod 15 in place at one of two slot 16' ends. The detent can be overcome manually by relative movements of the respective adjacent links, which under tension as suggested by the arrows forces the pivot rod 15 to the left as shown in its occluded position. If the respective links are compressed by movement contrary to the arrows, the pivot rod 15 will snap into the right end of slotted aperture 16' and can thus be removed through exit-entrance aperture 21, which has a diameter slightly larger than that of the pivot rod 15.

The position of the modified slotted apertures with a waist ridge 22 is optional. In the shown embodiment of FIG. 1, the occluded slot 16' with waist detent ridge 22 should be at a both ends of the pivot rod 15 on opposite edges of the links, or belt. However, a single one of the elongated apertures 16, preferably in the center of the link, can serve as a detent, or all of the elongated pivot rod apertures 16 can. The force to overcome the detent is, of course multiplied by the number of detent ridges 22 that must be overcome, and it is generally desirable to overcome the detent manually so that no tools or jigs are required. The edge link ends may simply contain a substantially round aperture 21 to occlude and retain the pivot rod 15 in place. The configuration of FIG. 1 however has the advantage of providing additional bearing space for the rod in the edge link end 18. The occlusion 20 may thus extend the thickness of the link end 18 or may be provided, for example, by molten plastic formed with the tip of a soldering iron from existing module plastic in the vicinity of the slotted aperture.

Figure 2:
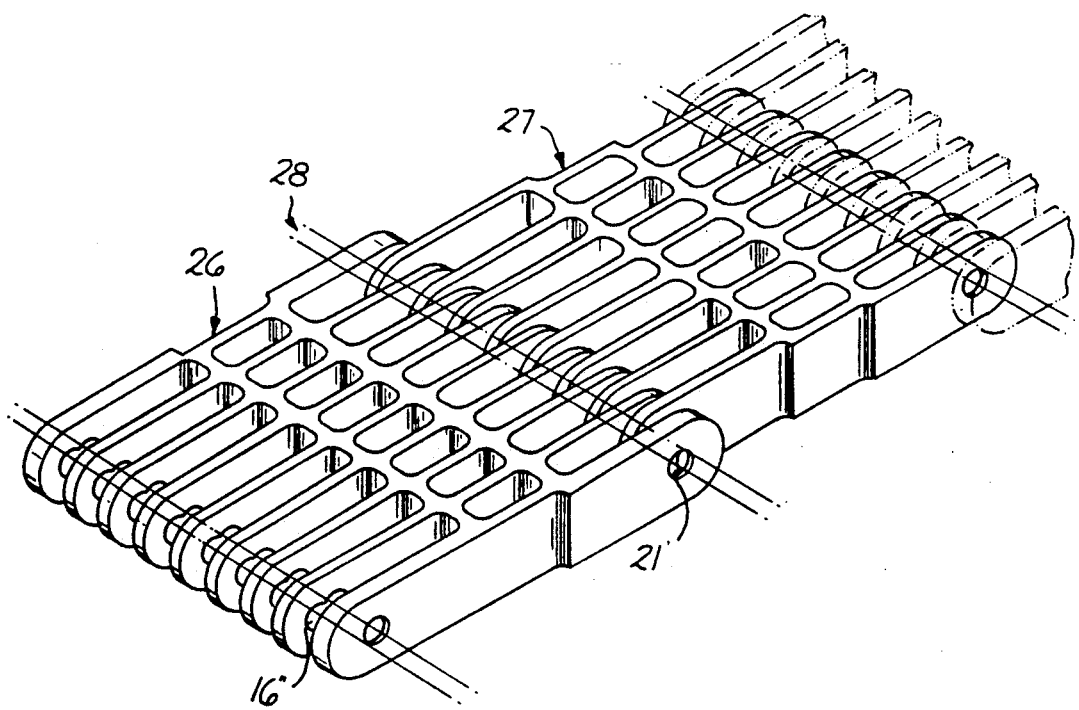
FIG. 2 is a perspective view of a modular link conveyor belt segment embodying the invention.

A fragmental portion of a conveyor belt formed from modular links 26, 27, etc. and articulated about pivot rod joints 28, etc. is shown in FIG. 2. This belt embodiment has two dissimilar modules 26, 27 alternated along its length. It may be seen that a single circuilar aperture 21' at the module edge links serves as the occluding aperture, whereas each of the remaining aligned pivot rod apertures 16" are of the "FIG. 8" waisted configuration, in this embodiment. The configuration of module 27 as different from module 26 is not necessarily typical, but this invention is not restricted to the particular module features other than the aperture configuration at the articulation joints 28.

Figure 3:
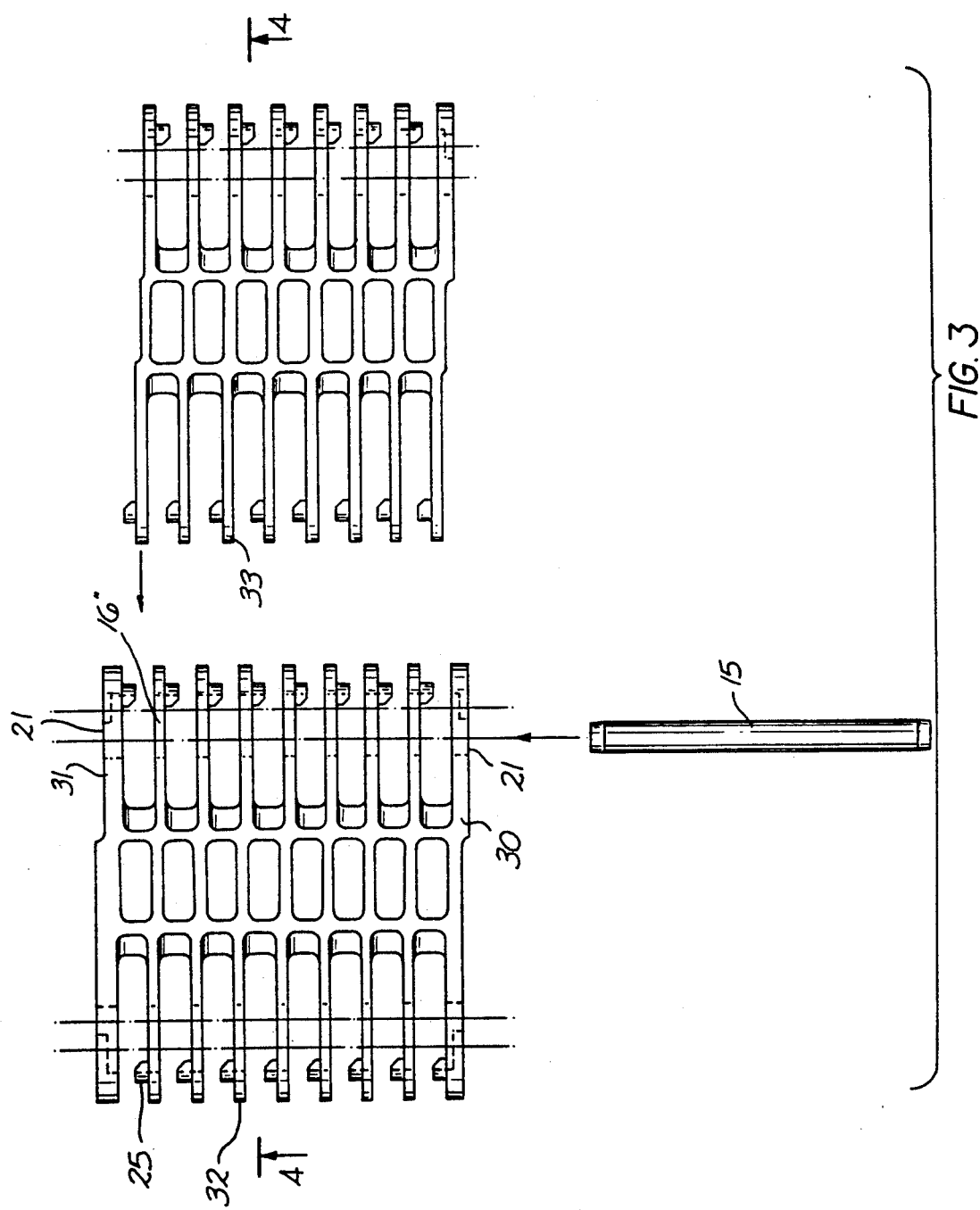
FIG. 3 is an exploded top view of the conveyor belt segment as shown in FIG. 2.
Figure 4:
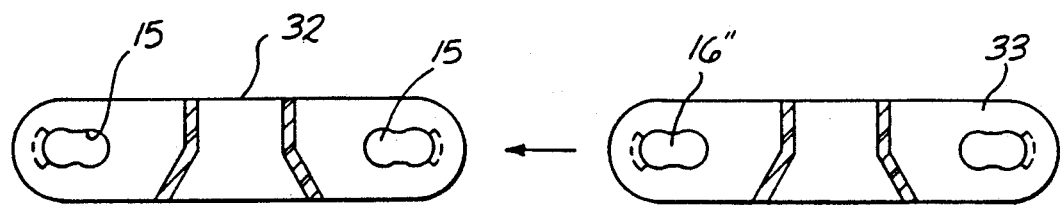
FIG. 4 is an end view, looking into arros 4–4 of FIG. 3.

The positioning of the respective edge link end 30, 31 access apertures 21, as best seen from the top view of FIG. 3 and end view of FIG. 4, is shown in dotted line format in axial registration at the inner ends of the elongated apertures 16" in the module in its slack detented position for permitting entry or exit of the headless pivot rod 15 into the aligned apertures.

Figure 6:
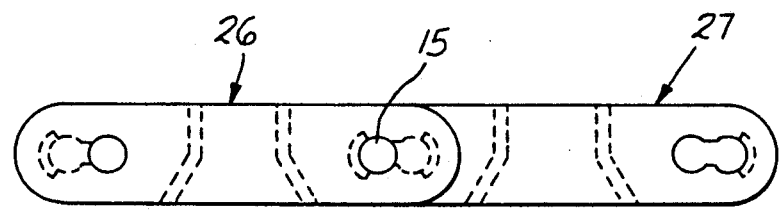
FIG. 6 is an end view of the FIG. 5 embodiment in a bistable detented position for inserting and removing pivot rods.
Figure 5:
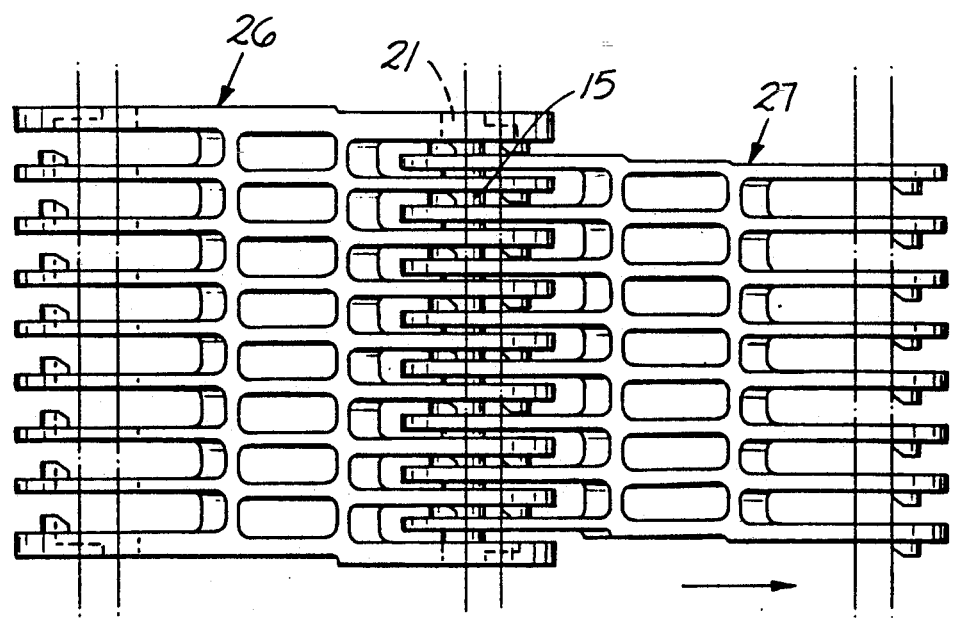
FIG. 5 is a top view of typical conveyor belt modules provided in accordance with this invention coupled together at an artuculated joint in a pivot rod insertion-removal detented position.

FIGS. 5 and 6 show the modules 26, 27 assembled in a slack pivot rod entry-exit detented bistable position with pivot rod 15 inserted through the accesss aperture 21.

Figure 7:
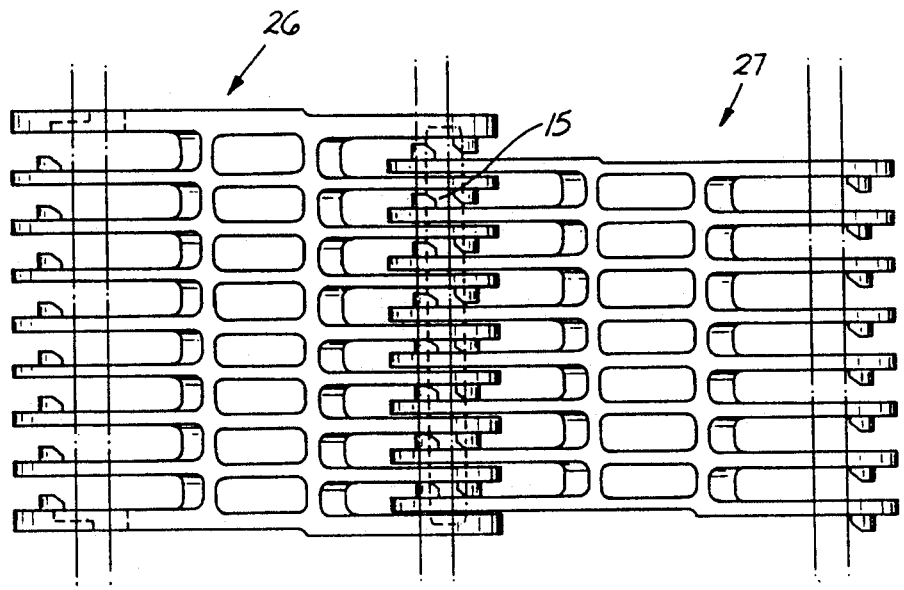
FIG. 7 is a top view of the FIG. 5 conveyer belt embodiment in a bistable working condition for keeping pivot rods axially confined.
Figure 9:
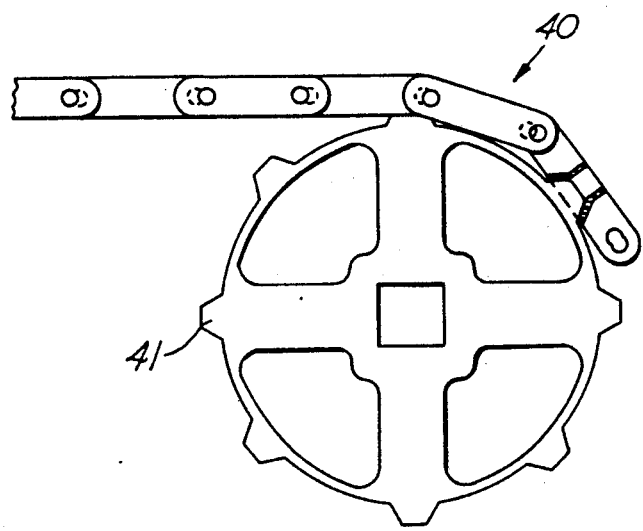
FIG. 9 is a fragmental view of a modular conveyor belt embodying the invention.

FIGS 7 and 8 show the modules 26, 27 assembled in a tension work load bistable detented position with the pivot rod 15 retained axially by occlusion at edge link ends. Thus the belt 40 positioned abount sprocket 41 in FIG. 9 shows the belt in working condition with the pivot rods detented in working position so that they do not become axially dislodged if slack is encountered or if the belt curves around bends, etc.

Figure 10:
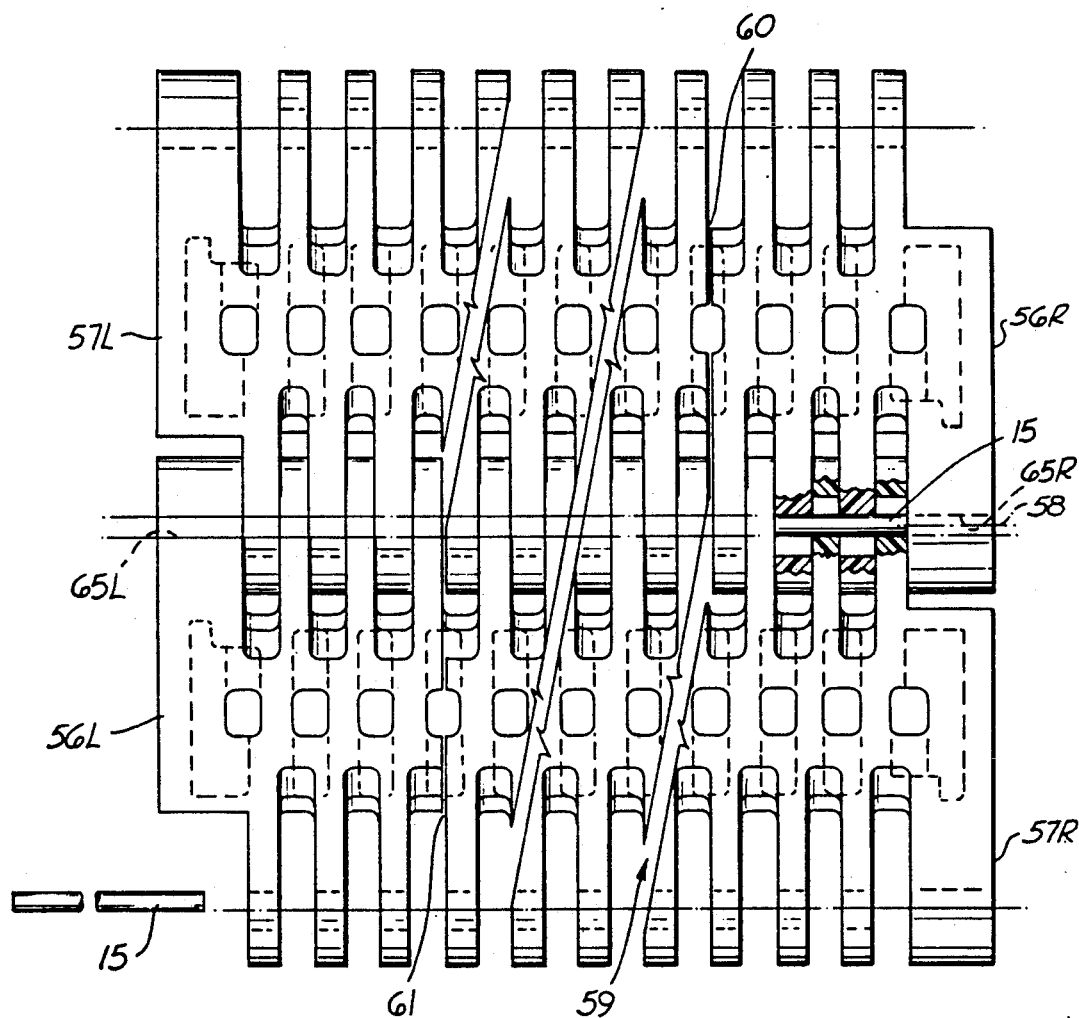
FIG. 10 is a plan view of a bricklayered belt section under compression.
Figure 11:
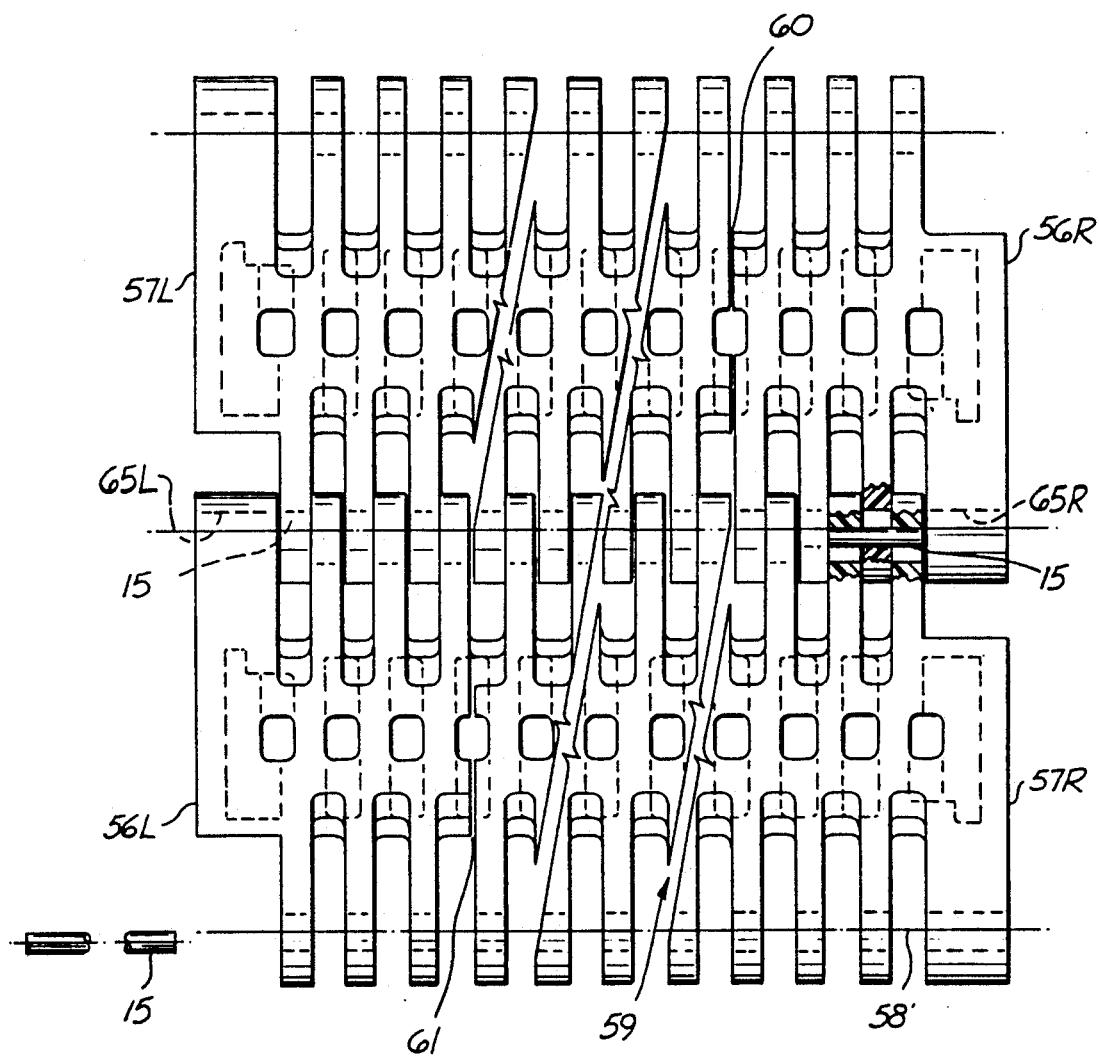
FIG. 11 is a plan view of a bricklayered belt section under tension.

In the bricklayered views of FIGS. 10 and 11, short belt edge modules 57L and 57R are respectively located on the left and right edges as seen in the drawing. The longer modules 56R and 56L, broken away at 59, abut the shorter modules at lines 60, 61 respectively.

The belt of FIG. 10 is shown in the compression mode, occurring when slack is in an unloaded belt. Thus, the access aperture 65R and 65L in the edge modules are aligned for insertion of pivot rod 15 along axis 58. The belt may then be "snapped" into the tnesion or loaded belt mode as shown in FIG. 11, where the pivot rod 15 is locked in place between the respective end modules 56L and 56R so that it cannot possibly be lost out of apertures 65R, 65L unless the belt modules are forcibly "snapped " back into the compression mode of FIG. 10. It is seen, therefore that the belt can go around curves, for example, without the danger of forcing an end of the pivot rod 16 into an access apertue 65.

Having therefore advanced the state of the art with improved conveyor belts and modular links, those features of novelty setting forth the spirit and nature of the invention are defined with particularity in the following claims.

I claim :

1. A modular conveyor belt having a pluralilty of modular links with interdigitate link ends pivoted about pivot rods providing for restricting lateral movement of the pivot rods in a moving conveyor belt under working conditions, comprising in combination, modular links having interdigitating link ends apertured for receiving a pivot rod therethrough to connect links pivotably end to end, wherein pivot rods of predetermined length are restricted against lateral movement out of resident position in elongated link end apertures positioned in a set of link ends defining the resident position, said elongated link end apertures being so structred to pemit the rods to move within the elongated apertures form one end of the apertures to the other, detenting means for bistably retaining the pivot rods at either end of the elongated apertures and permitting the rods to forcibly overcome the detenting means to move to either end, and link end pivot rod retention means for keeping the pivot rods in said resident position comprising a retention aperture in at least one link end for permitting entry of a pivot rod into said elongated link end apertures and retaining the pivot rods in said resident position, said retention aperture being located in said at least one link end to register with only one of the ends of the elongated apertures.

2. The belt defined in claim 1 further comprising plastic modular links of a resilient plastic material, wherein at least one of said elongated apertures has an intermediate restricted waist portion forming said detenting means.

3. The belt defined in claim 1 further comprising modular links defining an outer edge link end having an elongated aperture occluded at the link end outer edge at one end of the aperture to form said retention aperture.

4. The belt defined in claim 1 further comprising modular links having said elongated apertures in two sets of link ends extending from opposite ends of intermediate conveyor belt structure providing for a working belt bistable position with the pivot rods resident in the outermost ends of the elongated apertures in the two sets of link ends, wherein said retention aperture retains the pivot rods in resident position.

5. The belt defined in claim 1 further comprising modular links defining an outer edge link end having a substantially circular aperture permitting entry and removal of a pivot rod from said resident position aligned in registration with only one end of said elongated apertures.

6. A modular conveyor belt link of a resilient plastic material having interdigitating link ends with an aligned set of elongated apertures for receiving a pivot rod wherein at least one aperture has an intermediate waist detent restriction so dimensioned to retain pivot rods bistably in either of two ends of the elongated apertures.

7. The conveyer belt link of claim 6 further comprising a further aperture in a link end aligned with only one bistable pivot rod position in the elongated apertures of a dimension and position to permit entry and removal of pivot rods into said set of elongated apertures.

8. The conveyor belt link of claim 6 wherein each of the interdigitating link ends have said elongated apertures, and the link has an edge link end wherein the elongated aperture is occluded to prevent a pivot rod from exiting from one bistable position of the pivot rods in the elongated apertures.

9. The conveyor belt link of claim 8 wherein said edge link end comprises said aperture with the waist detent restriction.

10. A modular conveyor belt having a plurality of modular links with interdigitate link ends pivoted about pivot rods providing for restricting lateral movement of the pivot rods in a moving conveyor belt under working conditions, comprising in combination, modular links having interdigitating link ends apertured in alignment for receiving a pivot rod therethrough to connect links pivotably end to end, wherein headless pivot rods of predetermined length are restricted against lateral movement out of a resident position in elongated link end apertures positioned in a set of link ends defining the resident position, said elongated link end apertures being so structured to permit the rods to move within the elongated apertures from one end of the apertures to the other, at least one of said elongated link end apertures having an intermediate detent portion dimensioned to resiliently permit the pivot rod to rest in two bistable pivot rod retention positions at opposite ends of the slotted apertures, and at lease one link end at a belt edge having an aperture extending substantially in aligned registration with only one of said two bistable pivot rod retention positions to permit the pivot rod to be inserted into and removed from a pivoting position, whereby the pivot rod may be inserted into the slotted apertures and manually moved between the two bistable pivot rod retention positions by relative movement of end to end links coupled together by a pivot rod thereby to become bistably locked in place in a belt working position preventing movement of the pivot rod out of the belt edge.

11. In a modular conveyor belt wherein modular links connectd end to end to form the conveyor belt are interdigitated at articulated joints by means of a pivot rod extending through apertures defined in interdigitated link ends, the improvement for replaceably retaining headless pivot rods in place during operation of the conveyor belt under load, comprising in combination, a plurality of headless pivot rods, a plurality of modular links with interdigitate link ends adapted to be connected together end to end in a conveyor belt, elongated apertures formed in a plurality of interdigitated link ends of the modular links for retaining said headless pivot rods in place to hold links in end to end coupled articulated joints, detent structure for bistably holding pivot rods in residence in said elongated apertures at one of two ends of the elongated apertures, and retention means formed by the link end of a at least one link end near each of the opposite ends of a pivot rod in place in said elongated slots for operation of the conveyor belt shaped to retain the pivot rod in place in one of two bistable resident positions at either of the two ends of said apertured slots.

* * * * *